Sept. 30, 1930.   H. F. FARRELL   1,777,079
TRUCK CHASSIS DUMP BODY MOUNTING
Filed Oct. 21, 1926   3 Sheets-Sheet 3
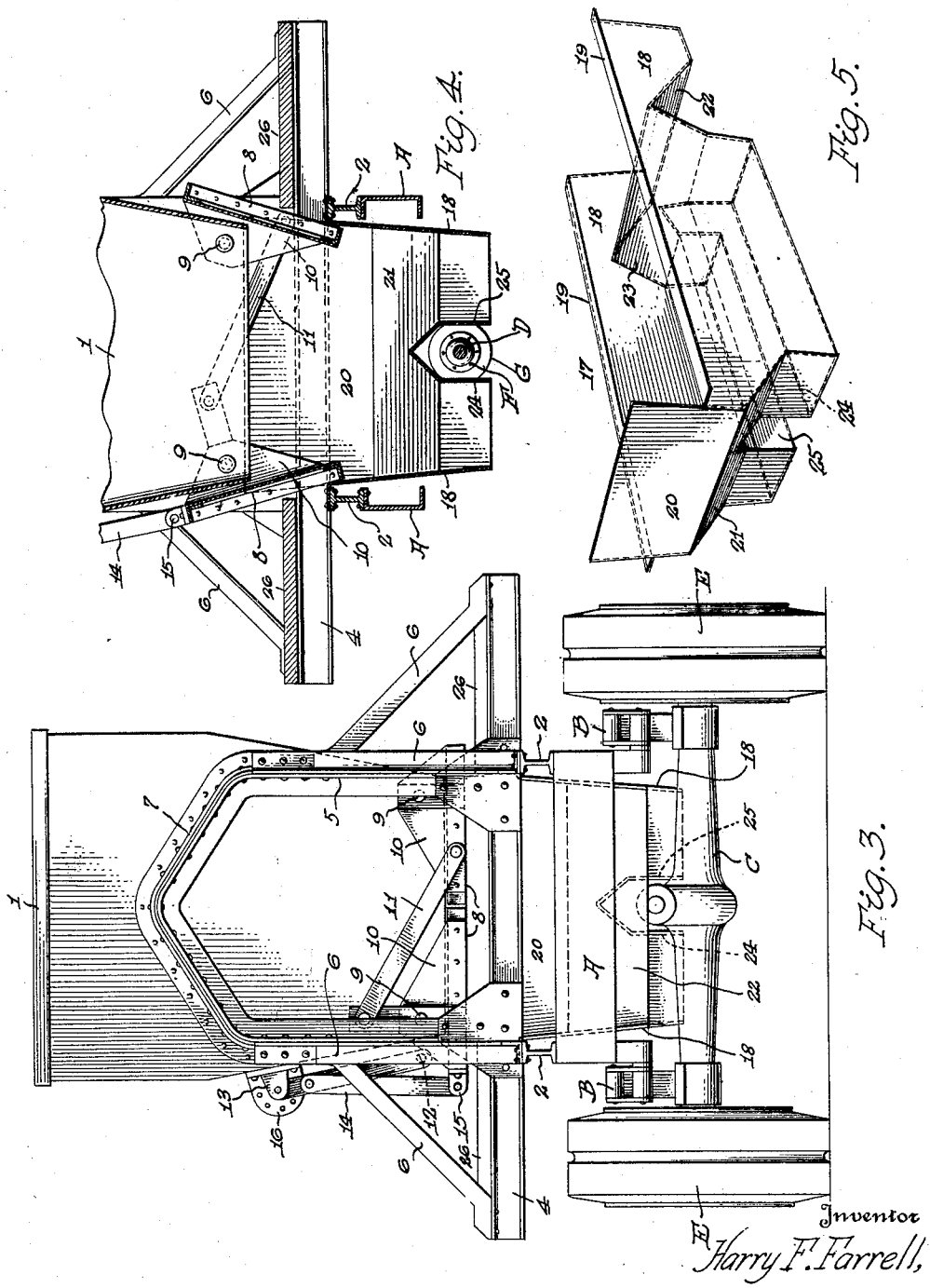

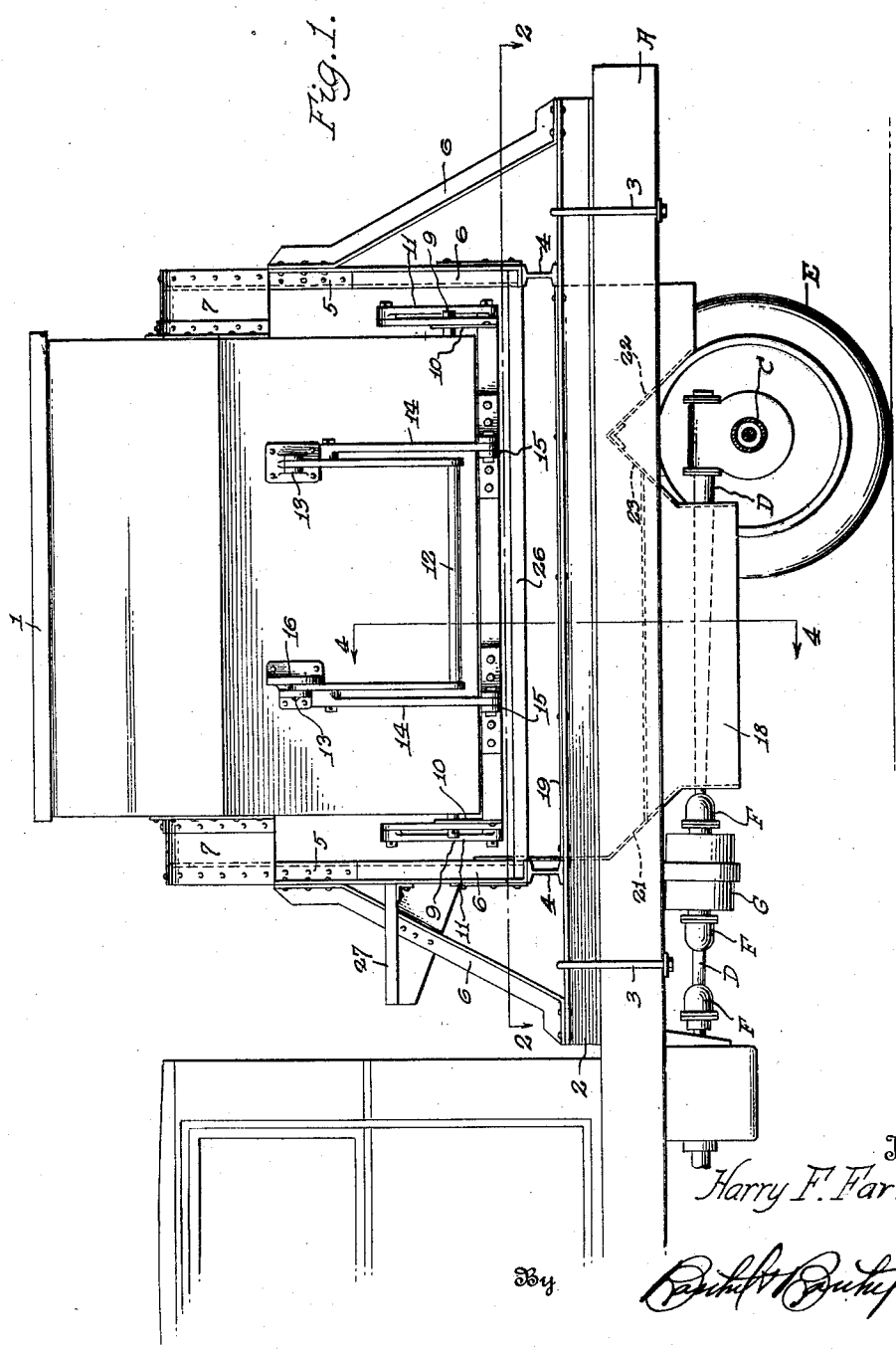

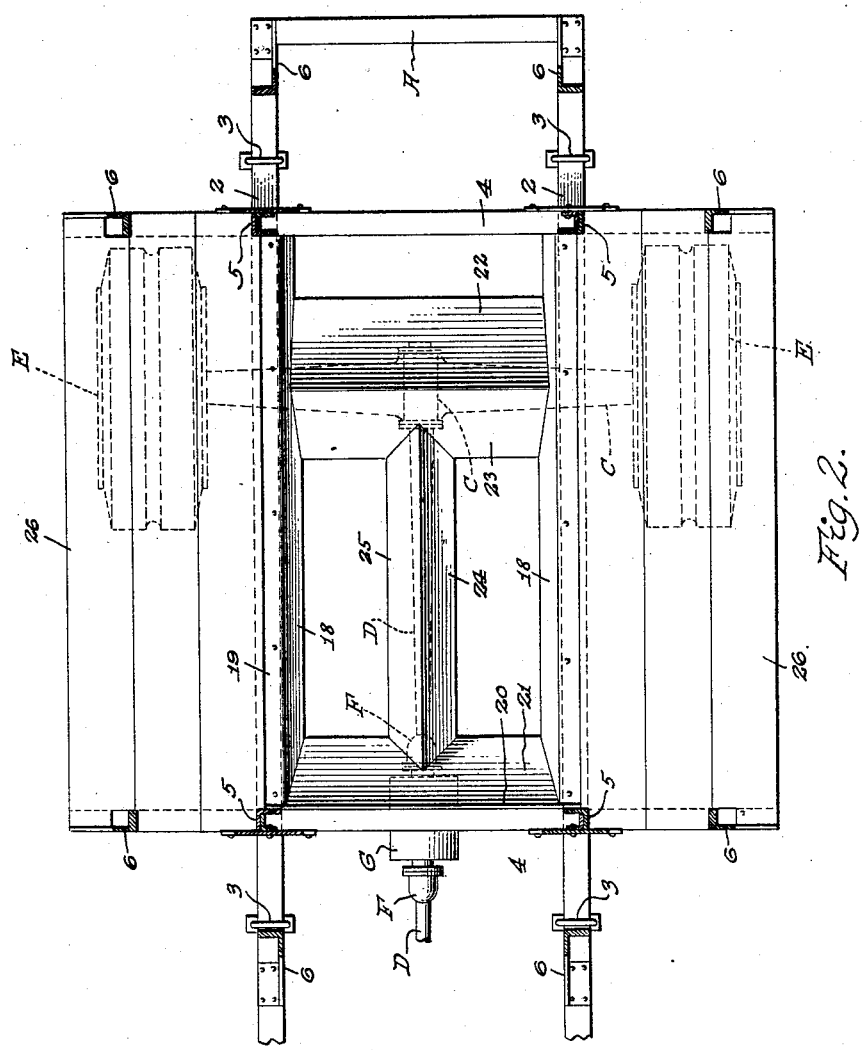

Patented Sept. 30, 1930

1,777,079

UNITED STATES PATENT OFFICE

HARRY F. FARRELL, OF ALMA, MICHIGAN, ASSIGNOR TO REPUBLIC MOTOR TRUCK COMPANY, INC., OF ALMA, MICHIGAN, A CORPORATION OF MICHIGAN

TRUCK-CHASSIS DUMP-BODY MOUNTING

Application filed October 21, 1926. Serial No. 143,034.

This invention relates to vehicles and more particularly to devices applicable to motor vehicles for dumping the load.

An object of the invention is to provide suitable means for directing the dumped load through the motor vehicle chassis and to protect the bearings and other parts of the chassis against injury from dirt and grit incident to dumping. It is also an object to provide a suitable mounting upon a vehicle chassis whereby a body of the bottom discharge type may be employed and to so construct such mounting as to make for simplicity in construction and economy and facility in the use of such a body upon motor vehicles. A further object is to provide certain other new and useful features in the construction and arrangement of parts, all as hereinafter more fully described.

With the above and other ends in view, the invention consists in the matters hereinafter set forth and more particularly pointed out in the appended claims, reference being had to the accompanying drawings in which—

Figure 1 is a side elevation of a motor vehicle with a dump body and mounting illustrative of the present invention in operative position thereon;

Fig. 2 is a sectional plan view of the same taken substantially upon the line 2—2 of Fig. 1;

Fig. 3 is a rear end elevation;

Fig. 4 is a cross-sectional detail substantially upon the line 4—4 of Fig. 1, and showing the bottom of the dump body in open or discharge position; and Fig. 5 is a perspective detail of a direction chute detached.

It has been the usual practice to provide motor vehicles, such as motor trucks, with side discharge dump bodies because of the difficulty arising from discharging the load upon the moving and other parts of the chassis when a bottom discharge is employed, although it is often of material advantage to use such a discharge, particularly where dumping space is limited, and although bottom dump devices are much more simple in construction and easier to operate than side delivery bodies. With the present arrangement and construction, a bottom delivery body or load carrier of any construction suitable for the purpose may be mounted upon the usual motor truck chassis to deliver the load downwardly therethrough and the bearing and other parts of the chassis will be protected against the injurious effects of grit or other matter getting into the moving parts, piling up thereon or adhering thereto. The present device has many advantages over the usual dumping arrangements as commonly applied to motor trucks, particularly in the handling of ready prepared road building materials and the like, and the arrangement and construction is such as to facilitate the handling and dumping operations.

As illustrating the application of the present invention to a motor truck of an old and well known construction, A indicates the usual chassis frame of the truck, which frame is supported by springs B upon the rear axle C to which driving power is transmitted by the propeller shaft D for driving the rear wheels E mounted at the ends of said axle, and this propeller shaft is shown as provided with the usual universal joints indicated at F and the brake drum G. A suitable dump body or box which is indicated as a whole by the numeral 1, is mounted upon the chassis frame A, over the rear axle and extends forwardly thereof, and a rigid mounting for this body in the form of a suitable supporting frame, is secured in place upon the frame A, said supporting frame comprising I-beams 2 laid upon the side members of the chassis frame longitudinally thereof and secured in place thereon by U-bolts or clips 3, and I-beams 4 placed transversely of the beams 2 and of the frame A adjacent and beyond the ends of the body with their ends projecting laterally beyond the side members of the chassis frame, and inverted U-shaped brackets 5 secured to these beams and extending upwardly therefrom at each end of the body with braces 6 riveted thereto at their upper ends and to the I-beams 2 and 4 at their lower ends to hold the brackets in an upright position and strengthen the same. The ends of the body 1 are rigidly secured to the upper ends of these brackets by sheet metal plates 7 bent to conform to the upper ends of the brackets and riveted thereto, the opposite edges of said plates being flanged and riveted to the ends of the body which is preferably formed of sheet steel. The body is therefore rigidly supported in an upright position upon its supporting frame which is detachably secured to the chassis frame by the U-members 3 or permanently secured thereto as desired.

The bottom of the dump body or bucket 1 is formed, in the construction shown, by a pair of doors 8 which are each pivotally attached at 9 to the lower end of the body by brackets 10 on the doors to swing laterally outward as shown in Fig. 4 to uncover the open lower end of the body and to swing to a horizontal position across said end and close the same. The door at one side is operatively connected to the door at the opposite side by a connecting rod 11 so that said doors are caused to swing in unison and to open and close these doors, lever mechanism is attached to one side of the body and comprises an operating bail 12 pivotally attached at the ends thereof to ears 13 on the side wall of the body, links 14 being pivotally attached to said bail intermediate the ends of the side arms thereof at one end and at their opposite ends to ears 15 projecting from the outer edge of one of the doors 8. By swinging the bail about its pivotal connection to the body, the pivot connection of the links 14 thereto is moved and the doors are opened or closed, these pivotal points of connection of the links to the bail, passing a center-line, passing through the bail pivots and the points of pivotal connection of the links to the door so that the doors will be locked in closed position by the bail, as shown in Figure 3. A sector 16 is secured to the body adjacent the pivotal connection of one arm of the bail to the body, and this sector is provided with a series of holes to receive any suitable bolt or pin to engage beneath the bail arm when the bail is swung upwardly, and lock the doors at any desired position in their opening movement. The doors may therefore be readily opened to discharge the load through the open lower end of the body by the swinging of the bail and the bail is operated with comparatively small effort, due to the leverage of said bail.

In order that the load discharge from the lower end of the body 1 may not fall upon the axle, propeller shaft, or universal joints or brake drum, a chute indicated as a whole by the numeral 17 and shown in detail in Fig. 5 is secured to the chassis frame directly beneath the lower end of the body 1 and in such position that when the doors 8 are in open position, their lower ends will extend downwardly into this chute a short distance and close the opening between the sides of the upper end of the chute and the lower ends of the side walls of the body, so that material falling from the body will be directed into the chute.

This chute is preferably formed of sheet metal and of general rectangular form with parallel side walls 18 which are inclined inwardly and downwardly and have outturned upper edge flanges 19 to engage and rest upon the longitudinal side members of the chassis frame A and are riveted or otherwise secured thereto to securely fasten the chute in place. At the forward end of the chute a vertical end wall 20 extends upwardly beyond the flanged edges of the side walls 18 to meet the forward side of the lower end of the body. This end wall may, if the chassis construction is such as to require it, be inclined rearwardly as at 21 to avoid the brake drum G and adjacent universal joint F, and is then extended vertically downward to bring the lower open end of the chute below the horizontal plane of the propeller shaft D. Transverse walls connect the side walls adjacent the rear end of the chute to form a transverse bottom channel to span the axle C, the wall 22 being inclined rearwardly and downwardly from a point near the upper edge of the side walls, and the forwardly and downwardly inclined wall 23 meets the upper edge of the wall 22 and extends to the lower edges of the side walls, the side walls being cut away between these inclined walls 22 and 23 to form the downwardly open channel to receive the axle, the walls of said channel directing the flow of discharged material from the body, forwardly and rearwardly of said axle and prevent the material from lodging thereon and getting into the working parts and bearings therein. A downwardly open longitudinal bottom channel is provided in the chute to receive and protect the propeller shaft D, said channel being formed by parallel downwardly extending walls 24 and 25 which meet at the longitudinal center-line of the chute in sharp angle directly above said propeller shaft to direct the downflow of material from the body to each side of said shaft, the ends of these walls 24 and 25 being united to the end wall 21 of the chute and to the wall 23 of the transverse channel, these walls 21 and 23 being cut away to leave the ends of the longitudinal channel open, this longitudinal channel thus opening into the transverse channel. The chute which is of substantially the same size as the open lower end of the body is thus provided with three discharge spouts, one at each side of the propeller shaft and one discharging to the rear of the rear axle and the load is directed past all parts of the chassis and prevented from coming into contact therewith. This is particularly desirable when material such as mixed concrete or other similar material is being handled as such material would adhere to the chassis parts, pile up thereon and grit and dirt would gradually work into the axle and joints and cause injury.

The I-beams 2 and 4 and the end supporting brackets 5 with their braces 6 not only provide a rigid supporting frame for the body 1 which may be readily applied to a truck chassis, but also forms supports for side platforms 26, planking being secured upon the laterally projecting ends of the I-beams 4, and the forward end support 5 also forms a support for an end platform 27 secured to the bracket in an elevated position so that the workmen may stand thereon and reach into the interior of the body for the purpose of loosening material which may adhere to the interior of the body after the discharge doors are opened, the platforms 26 providing places to stand when manipulating the bail 12 to open or close the discharge doors, also to carry tools or material and to form guards for protecting the rear wheels against load slopage and road dirt, all platforms being preferably provided with a metal covering, thus affording further protection to the working parts of the chassis.

Obviously the construction of chute may be modified within the scope of the appended claims to conform to the particular construction of chassis upon which the body is mounted and any suitable construction of bottom discharge body may be used.

Having thus fully described my invention, what I claim is:—

1. The combination with a motor vehicle chassis including a chassis frame, and a dumping body having a bottom discharge; of a supporting frame for the body including transverse members to be secured to the chassis frame and rest thereon, and supporting members on said transverse members and secured to the ends of said body to support the same in spaced relation to said chassis frame, and a chute secured to the chassis frame beneath said body and having an end wall extending upwardly in the chassis frame to the lower end of the body, said chute having walls therein shielding chassis parts.

2. The combination with a motor vehicle chassis including a chassis frame, and a dumping body having a bottom discharge; of a supporting frame for the body comprising transverse members secured upon said chassis frame, and upwardly extending supports on said transverse members at the ends of the body and to which the body is secured to support the body in spaced relation to said chassis frame, and a chute secured to the chassis frame beneath the body, the area of the upper end of said chute being substantially the same as that of the lower open end of the body, said chute being provided with walls meeting at an angle within said chute to provide a downwardly open channel adjacent the lower end of the chute adapted to receive a chassis member and shield the same.

3. The combination with a motor vehicle chassis including a frame and a transverse axle with a propeller shaft extending longitudinally forward from said axle, and a dumping body having bottom discharge doors and means operable from the side of the body for operating said doors; of a body supporting frame including transverse members secured upon the chassis frame and upright supports on said members at the ends of the body and between which the body is supported, said transverse members extending laterally beyond the sides of the chassis and body, platforms supported by the projecting ends of said transverse members at the sides of the body, and a chute secured to the chassis frame beneath said body, said chute having transverse and longitudinal walls meeting at an angle and forming downwardly open channels adjacent the lower end of the chute to receive and shield the said axle and propeller shaft, said walls being inclined downwardly to direct matter falling down said chute, laterally of said shaft and axle.

In testimony whereof I affix my signature.

HARRY F. FARRELL.